W. A. KILMER & A. T. WEAVER.
DEVICE FOR PREVENTING FORMATION OF BURS IN ELECTRIC WELDING.
APPLICATION FILED AUG. 23, 1912.
1,087,383.
Patented Feb. 17, 1914.
2 SHEETS—SHEET 2.
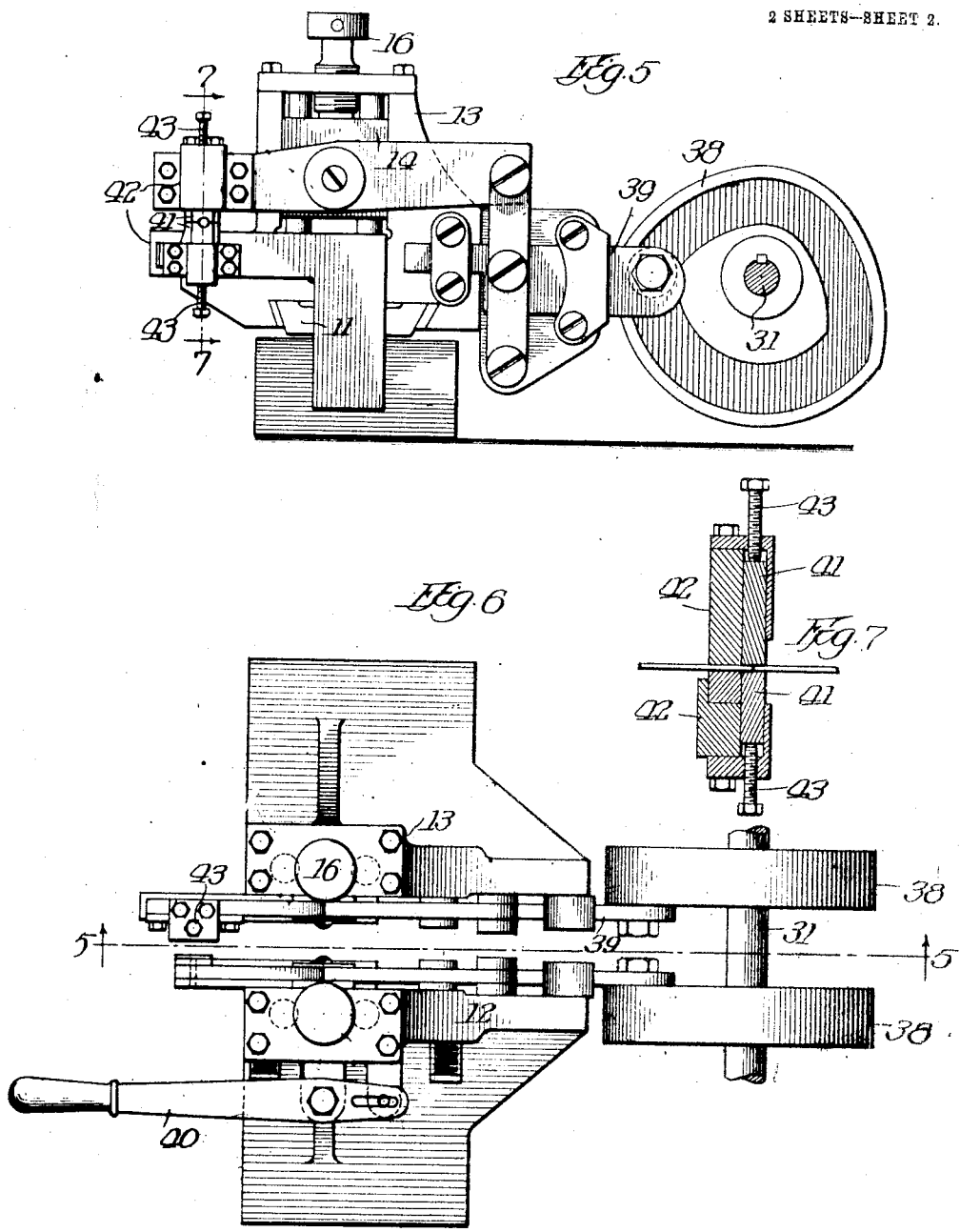

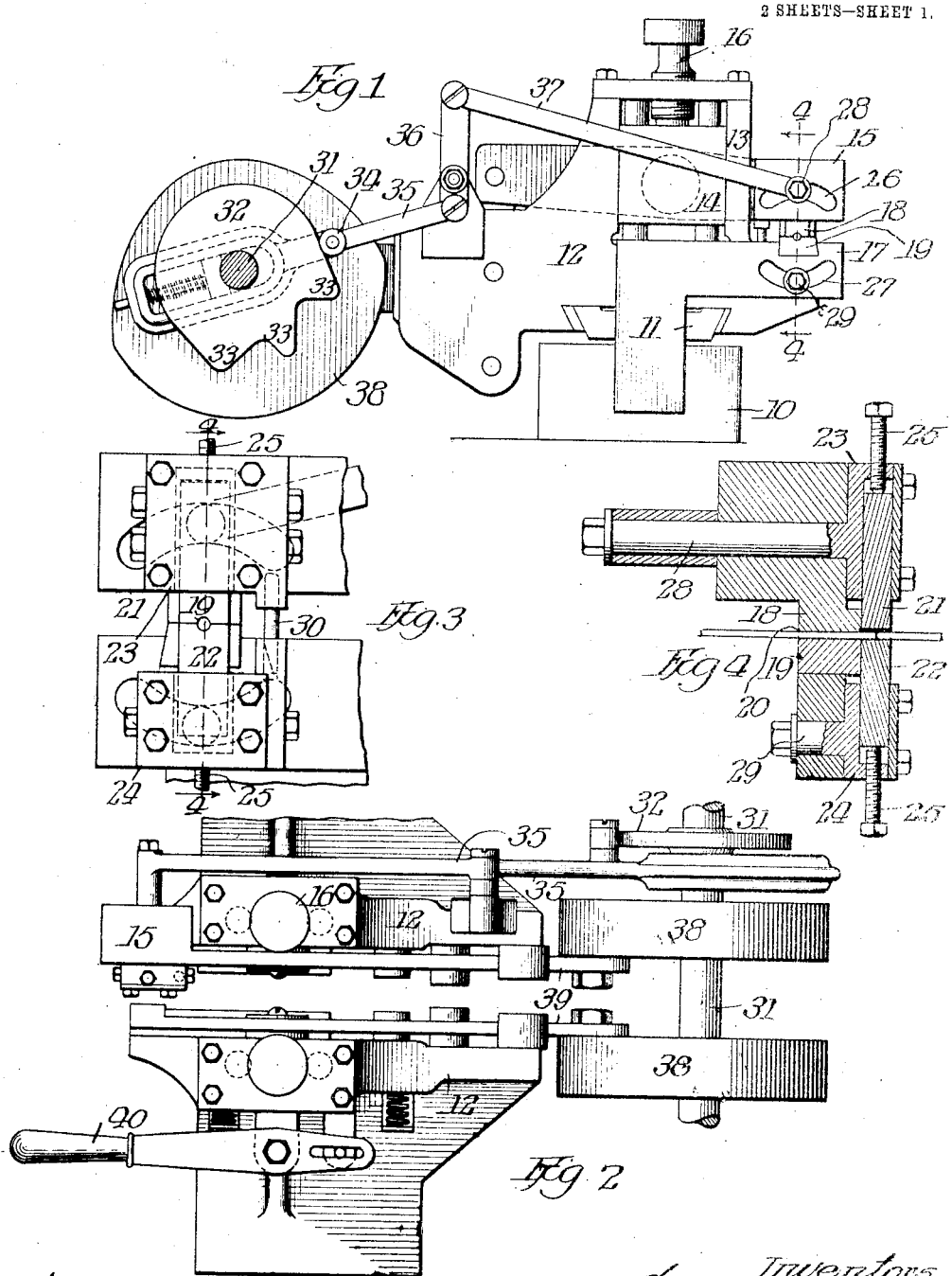

UNITED STATES PATENT OFFICE.

WILLIAM A. KILMER, OF DE KALB, AND ALBERT T. WEAVER, OF JOLIET, ILLINOIS, ASSIGNORS TO THE AMERICAN STEEL & WIRE COMPANY OF NEW JERSEY, OF HOBOKEN, NEW JERSEY, A CORPORATION OF NEW JERSEY.

DEVICE FOR PREVENTING FORMATION OF BURS IN ELECTRIC WELDING.

1,087,383. Specification of Letters Patent. Patented Feb. 17, 1914.

Application filed August 23, 1912. Serial No. 716,621.

*To all whom it may concern:*

Be it known that we, WILLIAM A. KILMER and ALBERT T. WEAVER, citizens of the United States, residing at De Kalb, in the county of Dekalb and State of Illinois, and Joliet, in the county of Will and State of Illinois, respectively, have invented certain new and useful Improvements in Devices for Preventing Formation of Burs in Electric Welding, of which the following is a specification.

In the practice of uniting iron and steel articles by electric welding it is common to clamp the two parts in engagement, then cause the metal to be fused. Simultaneously one of the clamping jaws is moved toward the other, thus displacing a quantity of the fused metal, this metal adhering to the surface of the article and causing an unevenness or bur.

We have devised and show in the accompanying drawings a machine arranged whereby the formation of the bur is prevented, thus obviating the necessity of removing the bur after the operation.

We are aware that machines have been devised for removing the bur but believe it is new to prevent the formation of a bur during the welding operation. A machine arranged to accomplish this result is shown in our co-pending application Serial No. 716,622, filed August 23, 1912.

The invention will be more readily understood by reference to the accompanying drawings, wherein, Figure 1 is a side elevation of a machine constructed and arranged whereby the bur is prevented from forming; Fig. 2 is a plan view of the same machine; Fig. 3 is an enlarged detail end elevation of the oscillating clamping jaw; Fig. 4 is a section on the line 4—4 of Fig. 3; Fig. 5 is a side elevation of a modification of the construction shown in the preceding figures; Fig. 6 is a plan view thereof, and, Fig. 7 is a section on the line 7—7 of Fig. 5.

Referring more particularly to the drawings it will be seen that we provide a base 10, having a guide 11 projecting from the upper portion thereof. Two sets of clamping jaws are dovetailed onto the guide 11, these clamping jaws being mounted in a frame 12, having a housing 13, carrying a vertically adjustable bearing member 14, on which the upper clamping jaw 15 is fulcrumed. The bearing member 14 is adjustable by means of the bolt 16. The clamping jaws just described are those to the left when viewing the machine from the front; that is, the upper clamp of Fig. 2. This clamp including the frame is arranged for adjustment with reference to the base 10, but is rigidly held in service. The bottom clamping jaw 17 is rigid, the upper jaw being the clamping member. The actual clamping portions as shown in Fig. 4, are the downwardly and upwardly projecting portions 18, 19 respectively, each carrying a semi-circular groove 20 therein. Secured to the ends of the clamping jaws 15, 17, are brushes or auxiliary clamps 21, 22. These are carried in the holders 23, 24 and are adjustable longitudinally by means of set bolts 25. The holders are mounted for oscillation in the arc-shaped slots 26, 27, formed in the ends of the jaws 15, 17. Short shafts or projections 28, 29 on the holders extend through the slots 26, 27 and guide the holders in an oscillating movement with the groove 20 as a center. The two holders are adapted for movement in unison by means of a connecting pin or rod 30, loosely mounted in one or both of the holders in order to provide for the separation of the jaws as required.

In order to oscillate the brushes we provide a power shaft 31, having a cam 32 thereon. This cam has a plurality of projections 33 thereon. An anti-friction roll 34, mounted on a link 35, which link is connected to a rocker 36 and a further link 37, transmits motion to the upper shaft 28, on the holder 23. It will be seen by the arrangement of the cams 33, that a plurality of oscillatory motions is imparted to the brushes.

Two face cams 38, keyed to shaft 31, provide the means in connection with the links 39, for raising and lowering the jaws as required. This is fully explained in our co-pending application hereinbefore referred to.

The other of the two clamping jaws is adapted for slight movement relative to the length of wire in the machine. This motion may be automatic or manual. We have shown in the accompanying drawings manually operable means such as the handle 40, for advancing the jaws to upset the metal at the point of fusion. It will be understood that the two ends of the wire A, shown in Fig. 4, are placed in contact at a point within the limits of the brushes or wipers 21. As the electric current is applied and the ends of the wire are fused, the oscillation of the brushes, occurring during the fusing period, compresses or wipes the surplus of metal from the wire, thus supplying the finished product at the end of the welding operation.

In Figs. 5 to 7 inclusive we have shown a similar construction except that the brushes do not oscillate. The elements of the clamping jaws remain the same as in the preceding figures, but in the end of the left hand jaws as viewed from the front we mount brushes 41, placed alongside the clamps 42. Means such as the set bolts 43 are provided for the adjustment of the brushes or clamps. In operation the two ends of the wire to be united will meet within the limit of the brushes 41 and the bur will be prevented from forming by reason of the clamping effect thereof; that is, the opening or groove between the two brushes is only of the size of the finished weld, therefore no surplus of metal is allowed to form on the exterior of the wire.

The constructions herein shown are typical of other forms which might be used whereby a similar result might be secured. Therefore we do not wish to be limited to the exact details herein shown and described.

We claim:

1. In a device of the class described, the combination of two sets of welding clamps, a pair of brushes interposed between said clamps and adapted to surround the product at the point of weld, and means for rotating said brushes transversely of the wire, substantially as described.

2. In a device for preventing the formation of burs in electric welding, the combination of a pair of clamps for holding the wire to be welded, brushes mounted between said clamps, means for separating said brushes to permit the entrance of the separated ends of wire to be welded, and means for causing rotation of said brushes through a fixed arc transversely of the wire, substantially as described.

3. In a device of the class described, the combination of clamps for holding the wire to be welded, brushes mounted between said clamps, said brushes when in operating position presenting an opening substantially the exact size of the wire to be welded, means for causing relative separation of said brushes, and means for causing limited rotation of said brushes transversely of the wire, substantially as described.

WILLIAM A. KILMER.
ALBERT T. WEAVER.

Witnesses to signature of William A. Kilmer:
T. H. HOBBS,
LOTT JENKINS.

Witnesses to signature of Albert T. Weaver:
JAMES E. SIME,
MARTIN W. SMITHWICK.